United States Patent [19]

Hutchins, IV

[11] 3,994,583
[45] Nov. 30, 1976

[54] NONCONTACTING METHOD AND APPARATUS FOR MONITORING THE SPEED AND TRAVEL OF A MOVING ARTICLE

[76] Inventor: Thomas B. Hutchins, IV, 310 NW. Brynwood Lane, Portland, Oreg. 97229

[22] Filed: Feb. 25, 1974

[21] Appl. No.: 445,095

[52] U.S. Cl. .............................. 356/28; 250/559; 250/578; 350/175 TS
[51] Int. Cl.² .......................................... G01P 3/36
[58] Field of Search ............... 356/28, 172; 350/45, 350/175 TS; 250/559, 561, 578

[56] References Cited
UNITED STATES PATENTS

| | | | |
|---|---|---|---|
| 2,464,793 | 3/1949 | Cooke | 350/175 TS |
| 3,486,032 | 12/1969 | Cufflin | 356/28 |
| 3,525,569 | 8/1970 | Gamertsfelder et al. | 356/28 |
| 3,612,888 | 10/1971 | Boucher | 250/219 D |
| 3,820,896 | 6/1974 | Stavis | 356/28 |
| 3,822,940 | 7/1974 | Goldfischer | 356/28 |
| 3,865,487 | 2/1975 | Andermo | 356/28 |

Primary Examiner—Maynard R. Wilbur
Assistant Examiner—S. C. Buczinski
Attorney, Agent, or Firm—Kolisch, Hartwell, Dickinson & Stuart

[57] ABSTRACT

A method and apparatus for monitoring the speed and travel of a moving article (such as a moving sheet of wood veneer) without contacting the article. The apparatus is stationary relative to such an article, and contains an optical imaging system including spaced coaxial positive lenses, and a cylindrical lens, which cooperate to produce, and to project onto a photodetector, a special distorted image of such an article. The projected image consists of moving elongated bands of light, wherein the speed of movement of the bands, and their travel distance in the image, are directly proportional to the speed and travel distance, respectively, of the viewed article. Further, the lenses in the imaging system are so arranged that the appearance of a projected image is substantially independent of changes, within a predetermined range, in the distance between the apparatus and the viewed article.

16 Claims, 8 Drawing Figures

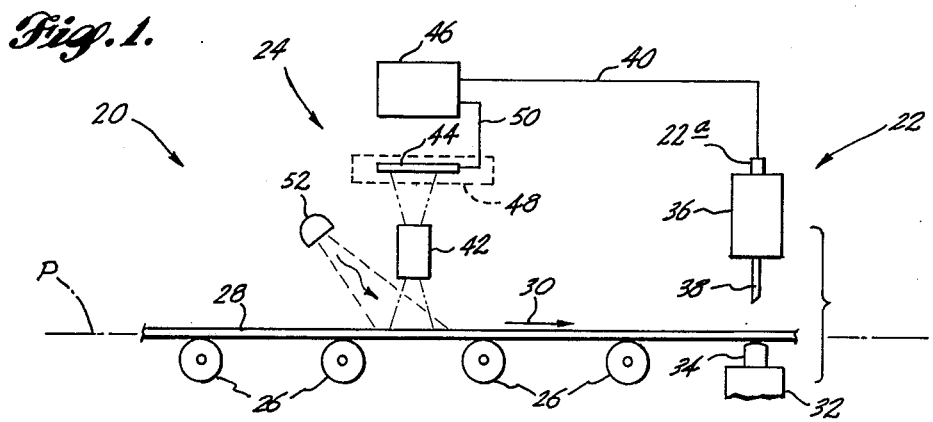
Fig.1.
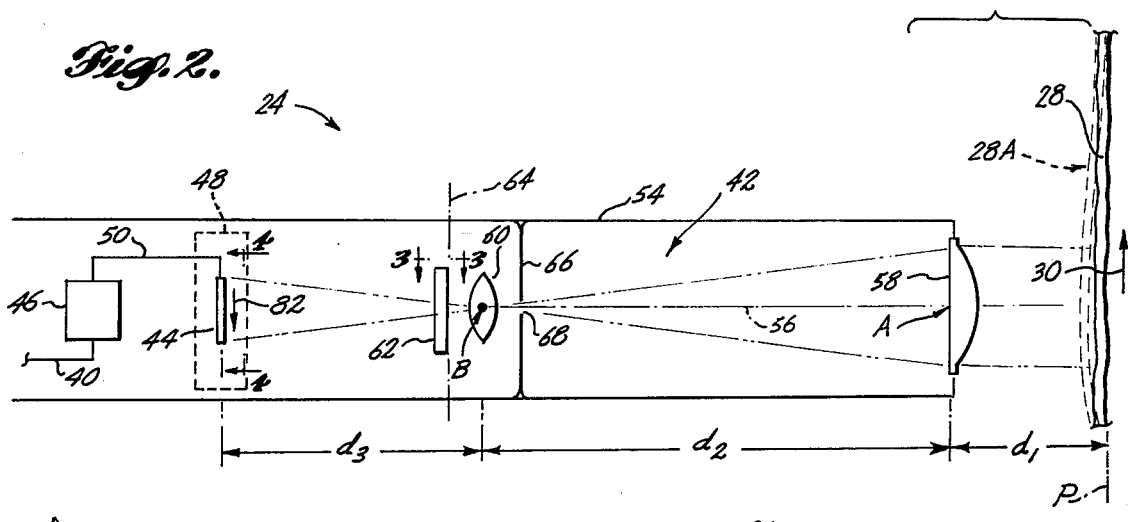
Fig.2.
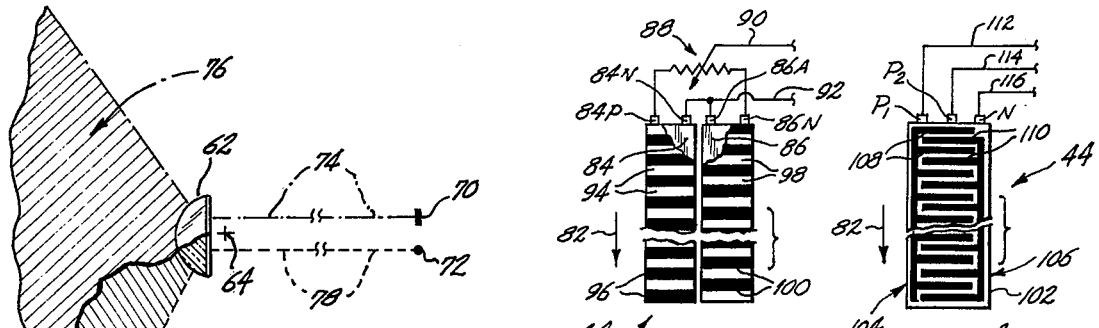
Fig.3.
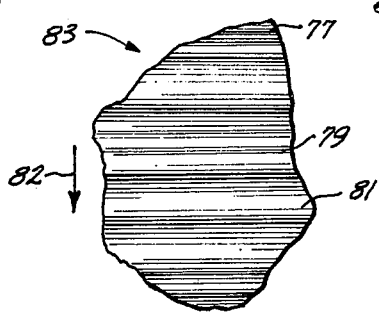
Fig.4.
Fig.5.

NONCONTACTING METHOD AND APPARATUS FOR MONITORING THE SPEED AND TRAVEL OF A MOVING ARTICLE

BACKGROUND AND SUMMARY OF THE INVENTION

This invention pertains to monitoring the speed and travel of a moving article, such as a moving sheet of veneer, without contacting the article. For the purpose of illustration herein, a preferred embodiment of, and a preferred method of practicing, the invention are described in conjunction with the clipping of veneer, in which application the invention has been found to have particular utility.

There are many applications where it is desirable to be capable of monitoring, continuously and accurately, the speed and/or travel distance of a moving article without contacting the article. While various approaches to this problem have been made in the past, the present invention is believed to be grounded on a significantly improved approach, whereby the accuracy and reliability of derived speed and travel distance information are appreciably superior to what has been obtainable heretofore.

Thus, a general object of the present invention is to provide a unique method and apparatus for the noncontact monitoring of the speed and travel of a moving article, which method and apparatus yield extremely accurate and reliable information.

Another object of the invention is to provide such a method and apparatus which is usable in a wide variety of applications and environments, and which does not require the services of skilled personnel.

A further object of the invention is to provide a method and apparatus as indicated which is capable of following even minute changes in the instantaneous speed of an article, and in the actual distance which the article covers in a given unit of time.

Yet another object of the invention is to provide apparatus of the type generally indicated which is extremely simple in construction, and readily mountable for use in numerous ways without requiring any appreciable modification of adjacent equipment.

The novel method of the invention contemplates the viewing of a moving article, and the production from such viewing of a unidirectionally defocused image of the article, which image comprises elongated substantially parallel moving bands of light. The method further contemplates the projection of such an image onto a photodetector, and the generation by the photodetector of an AC electrical signal whose frequency is at all times directly proportional to the then speed of the moving bands, and hence directly proportional to the speed of the viewed article. Another important characteristic of this signal is that a count of its cycles during an interval yields a direct indication of the actual travel distance covered by the article during such interval.

According to a preferred embodiment of the invention, the proposed apparatus comprises an optical viewing and imaging system, which includes spaced, coaxial, positive lenses that cooperate with a cylindrical lens to produce an image of the type just generally described above. These positive lenses include what might be called a "front" or "viewing" lens, and a "rear" or "imaging" lens—the nodal point of the latter being located, according to the invention, at the focal point of the former. Also included in the apparatus is a photodetector onto which an image produced by the imaging system is projected for the purpose of generating an electrical signal containing the desired speed and travel information. While several different specific photodetectors are illustrated and described herein, in general terms each comprises a plurality of elongated, substantially parallel, laterally spaced, side-by-side adjacent light-sensitive surfaces. The photodetector and imaging system in the apparatus are so oriented with respect to one another, that the longitudinal axes of the bands of light in an image derived from viewing a moving article substantially parallel the longitudinal axes of the light-sensitive surfaces in the photodetector. Reasons for the significance of such an arrangement will be discussed later.

With the construction just outlined, several important advantages are attained. For example, with the imaging system including a pair of spaced coaxial positive lenses, positioned as indicated, changes in the distance between a viewed article and the apparatus, within a predetermined range of distances, do not appreciably affect the appearance of the image produced by the imaging system. Thus, close tolerances are not involved with respect to mounting of the apparatus in place; and, slight movements of an article toward and away from the apparatus as the article travels through the field of view of the imaging system also do not affect image appearance. This latter consideration is of large importance in contributing toward maximum accuracy respecting the measurements made by the apparatus, since, if slight distance changes between an article and the apparatus could appreciably affect image appearance, they would also (as will become apparent) significantly affect the reported speed and travel distance of the article.

A further notable feature of the proposed imaging system is the incorporation therein of a cylindrical lens, or the like, which produces unidirectional defocusing in an image, whereby the projected image appears as elongated parallel bands of light. Suffice it to say, at this point, that the use of such a lens to produce such a defocused image both greatly improves the accuracy of the apparatus, and greatly simplifies its construction. The reasons for this will be explained more fully below.

Various other objects and advantages attained by the invention, including particular advantages offered by several different photodetector constructions disclosed herein, will become more fully apparent as the description which follows is read in conjunction with the accompanying drawings.

DESCRIPTION OF THE DRAWINGS

FIG. 1 is a very simplified side schematic view showing a portion of a wood-veneer handling system, including a veneer clipper, in which has been installed apparatus as contemplated herein for monitoring the speed and travel of veneer, with this apparatus arranged to control certain operations of the clipper.

FIG. 2 is an enlarged side schematic view showing details of the apparatus of the invention, and, further, showing the disposition thereof with respect to a nearby portion of a traveling veneer sheet—the subject matter of FIG. 2 being rotated 90° counterclockwise with respect to the view taken in FIG. 1.

FIG. 3 is a schematic view, on a larger scale than FIG. 2, taken generally along the line 3—3 in FIG. 2, showing a cylindrical lens used in the apparatus of the invention, and illustrating, in a greatly simplified manner, generally how this lens performs in the apparatus.

FIG. 4 includes two views, (a), (b), on roughly the same scale as one another, and on about the same scale as FIG. 3, taken generally along the line 4—4 in FIG. 2—views (a), (b) in this figure depicting two different photodetector constructions which may be used in the apparatus of the invention.

FIG. 5 is a fragmentary view, on about the same scale as FIGS. 3 and 4, showing a portion of an image formed according to the invention for projection onto a photodetector.

Figure 8:
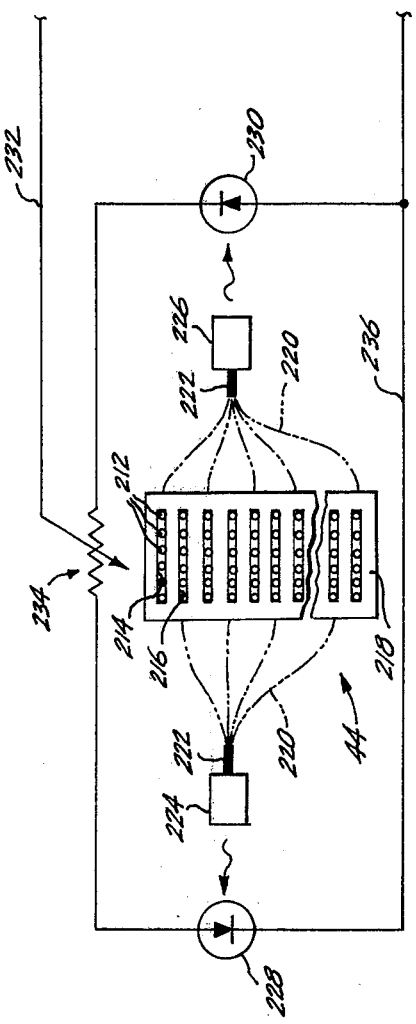

And, FIG. 8 shows still another modification of a photodetector usable in the apparatus of the invention—this photodetector employing fiberoptic material.

DETAILED DESCRIPTION OF THE INVENTION

1. The Equipment oF FIG. 1 Generally

Turning now to the drawings, and referring first to FIG. 1, indicated generally at 20, and shown in greatly simplified form, are portions of equipment used in the processing of wood veneer, including a clipper 22, and apparatus 24 constructed according to the present invention for controlling certain operations of the clipper. Included in equipment 20 is a power-driven conveyor including conveyor rolls, such as rolls 26, for transporting sheets of veneer (such a the sheet shown generally at 28) along a horizontal path indicated by the dash-dot line marked P. Veneer on the conveyor moves in the direction of arrow 30, and at a speed herein of about 500 feet per minute. As can be seen in FIG. 1, apparatus 24 is located upstream from clipper 22.

Clipper 22 herein comprises what might be thought of as an electrically triggered, pneumatically driven clipper. The clipper includes the usual base frame 32, on top of which is supported an elongated anvil 34 that extends across, and lies just beneath, path P. The clipper also includes an overhead frame 36 on which is mounted the usual vertically reciprocable, power-driven knife 38 that extends across path P directly above the anvil. Clipper 22 herein responds to a positive-going, triggering, electrical voltage pulse applied to its electrical input terminal shown at 22a. Knife 38 is pneumatically powered, and is actuated in a cutting stroke with each such voltage pulse.

In the particular arrangement depicted in FIG. 1, clipper 22 is intended primarily to clip oncoming continuous-sheet veneer into successive uniform 8-foot lengths. Such is a typical operation of a clipper. Apparatus 24, through continuously monitoring the speed and travel of veneer, is intended to supply appropriately timed triggering pulses to terminal 22a to effect such clipping. To this end, FIG. 1 shows, an electrical connection via conductor 40 between apparatus 24 and terminal 22a, through which conductor triggering pulses are carried herein.

It is appreciated that in many veneer clipper installations, clippers are used for other purposes than simply producing uniform-length sheets. For example, a clipper is often used for removing defective stretches of veneer. However, in order to simplify the present disclosure, it has been assumed herein that clipper 22 is not so used. Nevertheless, and with a reading of the description below, it will become readily apparent to one skilled in the art how apparatus 24 may be used in conjunction with a clipper so operated.

Continuing with a description of what is shown in FIG. 1, apparatus 24 includes an imaging system, or means, represented by a block 42, a photodetector, or image-receiving or light-sensitive means, represented by a block 44, and an interpreting circuit, or electrical circuit means, represented by a block 46. The photodetector is positioned in the apparatus in what is called a receiving station, represented in the figure by a dashed block 48. Circuit 46 is coupled through previously mentioned conductor 40 to terminal 22a in the clipper. In addition, this circuit is coupled through suitable conductors, represented by a line 50, to the photodetector in the apparatus.

Also included in the equipment shown in FIG. 1 is an overhead lighting system indicated generally at 52 which lights the top surface of veneer, in the region directly beneath imaging system 42. Preferably, and as is the case herein, this lighting system is located either immediately upstream or immediately downstream of apparatus 24, and is arranged to direct light at an acute angle onto the upper surface of veneer. Such an arrangement takes advantage of the natural surface texture in wood to create pronounced highlights and shadows on the surface region beneath the imaging system, which conditions aid, as will become apparent, the monitoring of veneer speed and travel.

Explaining briefly, and only in very general terms, how the equipment shown in FIG. 1 operates, apparatus 24 continuously monitors the movement of the veneer, and at appropriate time intervals which each indicate the passage of an 8-foot length of veneer, supplies a triggering pulse to the clipper, which then clips the veneer. It makes no difference what speed the veneer is moving, or whether its speed fluctuates, regarding the timely supplying of triggering pulses. In more particular terms, imaging system 42 derives a special image of the underlying moving veneer, which image it projects onto the photodetector. The latter then produces a continuous AC electrical signal taking the form of a pulse train and having a frequency which is at all times directly proportional to the then travel speed of the veneer. In addition, the occurrence of each cycle or pulse in this pulse train is directly indicative of the passage beneath the apparatus of a known length of veneer.

More specifically, and as will become apparent, for a given installation of apparatus 24, there will be a constant, or fixed, known relationship between signal frequency and veneer travel speed. Thus, for each given installation, the electrical pulses making up the signal coming from the photodetector may be counted in circuit 46 to give a direct indication of how far a sheet of veneer has traveled since the beginning of counting of pulses. Regardless of how fast or slow a sheet travels, a given number of counted pulses will always indicate the same travel distance for the sheet. This information may then be used, and is used by apparatus 24, to control the regular operation of clipper 22. With each generation of a triggering pulse, the counting of pules begins over again.

2. Details of Apparatus 24

Considering now the details of apparatus 24, and referring to FIG. 2, as was mentioned earlier in the description of the drawings, the orientation of parts shown in FIG. 2 is rotated 90° counterclockwise with respect to FIG. 1. Accordingly, arrow 30, which indicates the travel direction of veneer sheet 28, points upwardly in FIG. 2.

In the particular embodiment of apparatus 24 disclosed herein, all components in the apparatus are suitably mounted within an elongated cylindrical tube 54 whole longitudinal axis 56 is disposed substantially normal to the plane in which a sheet of veneer travels on the conveyor. Details of construction of tube 54, as well as the details of mounting of the various other components in apparatus 24, are not shown herein since they are conventional and form no part of the present invention. However, it should be noted that preferably the inside of the tube is coated with a suitable material to prevent light reflection from the inside wall of the tube.

Imaging system 42 comprises three coaxial lenses, or lens portions, centered on axis 56, and including a pair of simple positive lenses, or lens portions, 58, 60, and an elongated cylindrical lens, or lens portion, 62. Lens 58, also referred to as a viewing lens, is a plano-convex lens, having a diameter of 3-inches, and a focal length, indicated at $d_2$, of 15-inches. Lens 58 is suitably mounted adjacent the right end of tube 54 in FIG. 2. Apparatus 24 is positioned relative to path P so that the nodal point A of lens 58 is spaced about 5 inches, indicated at $d_1$, from the path.

Lens 60 is a double-convex lens, having a diameter of 1-inch, and a focal length of about 6.7-inches. This lens, also referred to as an imaging lens and an inverting lens, is positioned in the apparatus with its nodal point B coincident with the focal point of lens 58.

Cylindrical lens 62 has a length (measured vertically in FIG. 2) of 1-inch, and a focal length of about 1.6-inches. This lens is spaced along axis 56 about 0.25-inch from lens 60, and is disposed with its axis of revolution, shown at 64, substantially parallel to arrow 30. Lens 62, also referred to herein as a defocusing lens, is positioned with its planar surface facing lens 60, and its cylindrical surface facing photodetector 44.

Interposed between lenses 58, 60 is an aperture plate 66 including a central circular aperture 68 which is centered on axis 56, and which has a diameter of about 0.375-inch. Plate 66 is spaced about 0.25-inch to the right of lens 60 in FIG. 2.

Considering the specific positions of the lens parts in the imaging system relative to each other and to the photodetector, and how these positions were chosen, the photodetector is substantially centered on axis 56, and is disposed in a plane normal to this axis and spaced from point B by about 10-inches (indicated at $d_3$). The distances $d_3$ and $(d_1+d_2)$ are a matter of choice, and herein have been chosen to have the ratio of 1:2, whereby the travel speed of parts in an image projected onto the photodetector is one-half the actual travel speed of veneer.

The focal length of lens 58 is also a matter of choice, but preferably is chosen to permit convenient locating of lens 60 between lens 58 and the photodetector.

With the above choices having been made, the focal length of lens 60 is determined in a conventional manner by the formula:

$$\frac{1}{f} = \frac{1}{d_1 + d_2} + \frac{1}{d_3}$$

where $f$ is the focal length of the lens.

Lens 62 may be located substantially anywhere between lens 58 and the photodetector. It may, in fact, be combined as an integral part with either of the other lenses in the system. The specific dimensions of lens 62 might, of course, have to be changed to accommodate its particular placement—the key criterion being that it be sufficiently large to intercept substantially all of the optical transmission along the axis of the system. The focal length of this lens is a matter of choice, and preferably has a value ensuring a suitably widely spread image (as will be explained below) in the plane of the photodetector.

Considering now FIGS. 3 and 5, along with FIG. 2, FIG. 3 provides another and enlarged view taken from the upper end of lens 62 in FIG. 2. Lens 62 functions specifically in the apparatus to produce, on its left side in FIGS. 2 and 3, a unidirectionally defocused or distorted image of what is presented it optically on its right side in the figures. Such defocusing herein takes place in a direction substantially at a right angle to axis 64, and hence at a right angle to the direction in which a sheet of veneer travels. In FIG. 3, a very simplified attempt has been made to show graphically the kind of defocusing produced by lens 62—which defocusing is important in the functioning of the apparatus of the invention. Thus, shown on the right side of FIG. 3 are two objects which are viewed by the right side of the lens in the figure—one of these objects being represented by a darkened square dot 70, and the other by a darked circular dot 72. For the purpose of the illustration made in FIG. 3, it is assumed that dots 70, 72 lie in two different planes parallel to the plane of FIG. 3, with the plane of dot 70 being closer to the viewer than the plane of dot 72.

Lens 62 views dot 70 along dash-dot line 74, and at its left side in FIG. 3, produces a spread-out, defocused image of the dot in a plane, shown as shaded plane 76, which is in the same plane as line 74. The dash-dot lines which are shown bounding the outer edges of plane 76 in FIG. 3 are for illustration purposes only, and do not necessarily represent the exact outer boundaries of this plane.

Dot 72 is viewed by lens 62 along dashed line 78. On its left side in FIG. 3, and in a plane, shown as shaded plane 80, lens 62 produces a spread-out defocused image of dot 72.

Were the two defocused images which have just been described projected onto a screen, or the like, on which they could be viewed, these images would appear as elongated, uniform intensity lines or bands, each having a thickness directly related to the depth (measured normal to the plane of FIG. 3) of the particular dot from which it was derived.

In apparatus 24, it will be apparent that lens 62, on its right side in FIGS. 2 and 3, is provided with a substantially undistorted, though inverted, image of a portion of traveling veneer sheet 28. Lens 62 defocuses and deforms what is thus presented at its right side in FIGS. 2 and 3 to produce at its left side in these figures, in the manner just described, a defocused image derived from the view of the veneer sheet. Such an image herein comprises elongated substantially side-by-side parallel bands of light, with each band, along its length, having a substantially uniform intensity, and with different bands in the image differing from one another in intensity, depending upon the specific highlight and shadow character of the surface region of veneer from which the image is derived.

The bands in an image are projected onto the photodetector in station 48, and at this location might typically look like the bands, such as those shown at 77, 79, 81, in the portion of an image 83 depicted in FIG. 5. These bands are disposed at substantially a right angle to the direction of veneer travel, and move in an image at a speed which is at all times directly proportional to the travel speed of the veneer. The direction in which bands in an image move is indicated by arrow 82, and is the exact reverse of the direction of veneer travel because of the optical inversion produced by lens 60.

In the particular apparatus being described, the focal length named above for lens 62 assures sufficient spreading of an image so that the ends of bands in the image extend beyond the sides of the photodetector.

Another special feature of the imaging system described is that it uses a pair of positive lenses, with the focal point of the viewing lens coincident with the nodal point of the imaging lens. With such construction, the apparatus is capable of ignoring minor changes which occur in the actual distance between the nodal point of the viewing lens and the viewed surface of a sheet of veneer. In other words, within a range of distances, which can be determined for the particular imaging system used, a change in the distance just mentioned within this ranges does not appreciably affect the appearance of an image projected onto the photodetector.

This is an important feature since, in viewing moving material like wood veneer, it is well understood that there is a certain amount of waviness in this material which, with travel of the material past an apparatus like apparatus 24, results in distance changes of the type mentioned. Also, operation of the clipper causes momentary limited buckling in oncoming veneer. For example, and in FIG. 2, there is shown in dashed outline, at 28A, a wave in the sheet of veneer, which wave results in the left side of the veneer in the dashed figure being closer to lens 58 than the left side of the veneer as shown in solid outline in the figure. In apparatus 24, the range of distances within which image appearance is not affected is between about 4.5-inches and about 5.5-inches from nodal point A.

Describing now the construction of a photodetector 44 used according to the invention, FIGS. 4(*a*), 4(*b*) illustrate two different modifications of such a device. Describing first the construction shown in FIG. 4(*a*), included are two elongated, planar, subtantially rectangular PN photodiodes 84, 86 disposed in side-by-side adjacent, substantially parallel relationship. Each of these photodiodes includes the usual P and N terminals, designated 84P, 86P and 84N, 86N, respectively. Terminals 84P, 86N are connected to the opposite ends of the winding in a suitable adjustable resistor 88—the wiper in which is connected to a conductor 90. Terminals 84N, 86P are each connected to a conductor 92. As viewed in FIG. 4(*a*), each photodiode has a length of about 1-inch, and a width of about 0.1-inch.

Each of photodiodes 84, 86, as so far described, is entirely conventional, and performs in a manner well known to those skilled in the art. Resistor 88 functions as a balancing resistor, balancing signals generated by the two photodiodes. Conductors 90, 92 are included in what was shown in FIGS. 1 and 2 as line 50.

Suitably formed on or attached to the two faces of photodiodes 84, 86 which confront the viewer in FIG. 4(*a*) are masks, or the like, which "divide" the face of each photodiode into a plurality of elongated, side-by-side adjacent, substantially parallel light-sensitive surfaces, or regions, separated by elongated parallel blanked-out strips which prevent light from striking the underlying surface portion of the photodiode. Thus, the face of photodiode 84 may be thought of as being divided into plural light-sensitive surfaces, such as surfaces 94, divided by blanked-out strips, such as strips 96. Similarly, the surface of photodiode 86 is divided into light-sensitive surfaces, such as surfaces 98, separated by blanked-out strips, such as strips 100. Surfaces 94, 98 are also referred to herein as light receptors.

While different specific techniques may be used so to prepare the face of a photodiode, one technique which has been found to be useful, and with which photodiodes 84, 86 have been prepared, is to adhere to the face of the photodiode a developed photographic negative carrying opaque and transparent lines with the appropriate widths.

As measured vertically (e.g., longitudinally of the photodetector) in FIG. 4(*a*), the light-sensitive surfaces and blanked-out strips just described each have uniform widths of about 0.005-inch. Thus, distributed along the face of each photodiode are light-sensitive surfaces with a distribution of about 100 surfaces per inch of length of the photodiode. Further, the photodiodes are so arranged that the longitudinal axes of surfaces 94, 98 are at substantially a right angle to the direction in which bands in an image move over the surfaces. The direction of such movement is shown by arrow 82. Thus, the bands in an image projected onto the photodetector substantially parallel surfaces 94, 98.

It will be noted that photodiodes 84, 86 are so arranged in FIG. 4(*a*) that each surface 94 in photodiode 84 is aligned longitudinally with a blanked-out strip 100 in photodiode 86, and that each blanked-out strip 96 in photodiode 84 is aligned longitudinally with a surface 98 in photodiode 86. It is this arrangement which assures the production, by the connected combination of the photodiodes, of an appropriate AC electrical signal with movement of bands thereover. Thus, the construction shown in FIG. 4(*a*) may be characterized as comprising two side-by-side arrays of elongated, substantially parallel light-sensitive surfaces, arranged with each such surface in an array offset with respect to surfaces in the other array in the direction that bands of light in an image move when projected onto the arrays.

With movement of a band of light over photodiodes 84, 86, and AC voltage is developed between conductors 90, 92 having a frequency which is directly proportional to the speed of such movement. The value of such frequency is the mathematical product of the number of light-sensitive surfaces per inch along the photodiodes (100 herein), times the travel speed in inches/second of bands over the photodiodes. With veneer traveling on the conveyor at 500 feet per minute (or 100 inches per second), the frequency of this voltage will be 5000 Hertz, calculated as follows:

$$100 \ \frac{\text{surfaces}}{\text{inch}} \times 50 \ \frac{\text{inches}}{\text{sec}} (\text{band speed}) = 5000$$

Turning now to the photodetector shown in FIG. 4(b), this comprises what might be thought of as an interdigitated construction including, inn a single array, two banks of light-sensitive surfaces. This photodetector is unitary, and includes an elongated, rectangular, substantially planar semiconductor base plate 102 which, for example, might be formed of a conventional N-type material, on one side of which have been deposited (by conventional techniques) two P-type semiconductor "combs" 104, 106. As viewed in FIG. 4(b), plate 102 has a length of about 1-inch, and a width of about 0.25-inch. For the purpose of obtaining better clarity in FIG. 4(b), combs 104, 106 have been shown in heavy black lines so as to contrast them clearly on the surface of plate 102. What might be thought of as the "teeth" in comb 104, such as teeth 108, define one bank of elongated, side-by-side adjacent, substantially parallel light-sensitive surfaces. Similarly, the teeth, such as those shown at 110, in comb 106 define the other bank of such surfaces. It will be noted that teeth 108, 110 are laterally spaced from one another, and are interleaved, with each tooth 108 separated from an adjacent tooth 108 by a tooth 110, and vice versa. In the contruction shown in FIG. 4(b), each tooth in a comb, and each space between adjacent teeth, is about 0.0025-inch wide (measured longitudinally of the photodetector). Hence, the teeth in a given comb have the distribution on plate 102 of 100 teeth per inch of length of the plate.

The photodetector of FIG. 4(b) includes three output terminals, including two P terminals designated $P_1$, $P_2$ and an N terminal designated N. Terminals $P_1$, $P_2$ are conductively connected to combs 104, 106, respectively, and to conductors 112, 114, respectively. Terminal N is connected to plate 102 and to a conductor 116. With respect to this photodetector, conductors 112, 114, 116 are included in previously mentioned line 50.

The photodetector of FIG. 4(b) operates in a manner somewhat similar to that of the photoconductor of FIG. 4(a). Here, however, unipolar electrical square wave voltage pulses are produced between each of two different pairs of conductors—the combination of plate 102 and teeth 108 producing such pulses between conductors 112, 116, and the combination of plate 102 and teeth 110 producing such pulses between conductors 114, 116. The frequency with which pulses are generated between a given pair of these conductors depends upon the frequency with which a given band in an image impinges successive teeth in the comb associated with the particular pair of conductors. In the construction described, and for a given travel speed for bands in an image, such frequency will be the same as that of the AC voltage produced between conductors 90, 92 by the photodetector of FIG. 4(a). Thus, and with a veneer speed of 500 feet per minute, the pulses between each of the two pairs of conductors mentioned would occur at the rate of 5000 Hertz.

Figure 6:
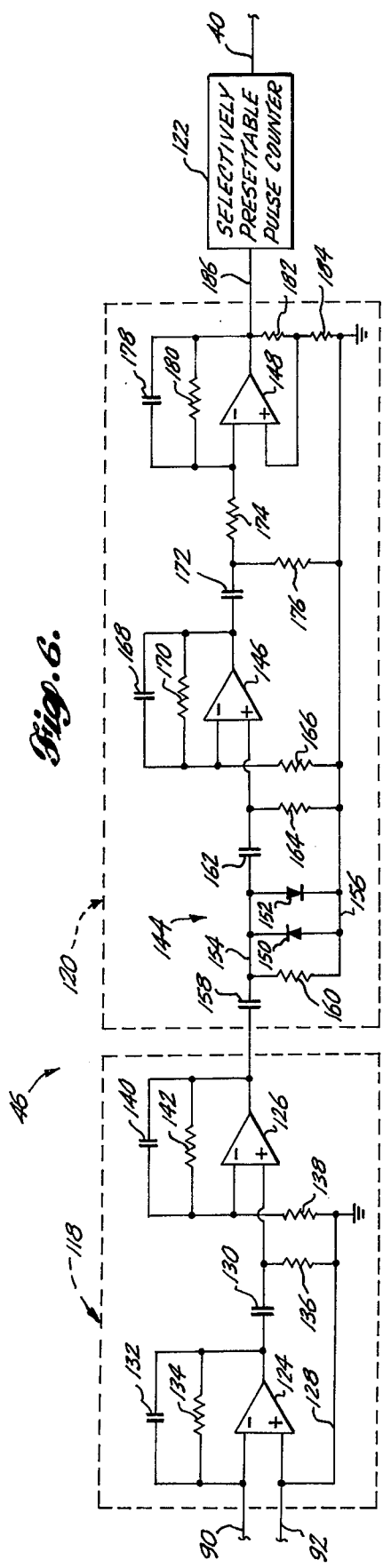
FIG. 6 is a circuit diagram, partly in block form, illustrating a circuit which is used in conjunction with a photodetector such as that shown in FIG. 4(a).

Turning now to FIG. 6, this illustrates the construction of an electrical circuit 46 which is used in the apparatus in conjunction with the photodetector of FIG. 4(a). Included in this circuit are an input circuit 118, an output circuit 120, and a selectively presettable pulse counter shown in block form at 122.

The input circuit includes a pair of conventional integrated-circuit operational amplifier units 124, 126. The inverting input of unit 124 is connected to conductor 90, and the noninverting input both to conductor 92 and to a grounded conductor 128. The output terminal of unit 124 is AC-coupled through a capacitor 130 to the noninverting input of amplifier unit 126. Interconnecting the output and the inverting input of unit 124 is the parallel combination of a capacitor 132 and a resistor 134.

The noninverting and inverting inputs of unit 126 are grounded through resistors 136, 138, respectively. A capacitor 140 in parallel with a resistor 142 interconnects the inverting input of unit 126 with the output of this unit.

In the input circuit, unit 124 and its immediately associated circuit components function as a zero-input-impedance, current-in voltage-out amplifier, and unit 126 with its immediately associated components functions as a voltage amplifier.

Output circuit 120 includes a limiter 144 and a pair of operational amplifier units 146, 148 which are substantially the same in construction as previously described units 124, 126.

Limiter 144 comprises a pair of oppositely poled, parallel-connected diodes 150, 152 which are connected between a pair of conductors 154, 156. Coupling the limiter to the output of amplifier unit 26 is a capacitor 158 which connects this output with conductor 154. A resistor 160 interconnects conductors 154, 156. Conductor 156 is grounded.

The noninverting input of unit 146 is connected to the limiter through a capacitor 162 and conductor 154. This input is also connected through a resistor 164 to conductor 156. The inverting input of unit 146 is connected through a resistor 166 with conductor 156. The parallel combination of a capacitor 168 and a resistor 170 interconnect the inverting input of this unit and the output of the unit.

Connected in series between the output of unit 146 and the inverting input of unit 148 are a capacitor 172, and a resistor 174. The junction between these two components is connected through a resistor 176 to conductor 156. Coupling the inverting input of unit 148 and the output of the unit, and in parallel with one another, are a capacitor 178, and a resistor 180. The noninverting input of unit 148 is connected directly to the junction between a pair of series-connected resistors 182, 184 which extend between the output of unit 148 and conductor 156.

Within output circuit 120, limiter 144 functions in a well-known manner to limit the peak-to-peak voltage level attainable by an AC voltage supplied the limiter. Thus, and assuming that a sufficiently large AC voltage is applied to the limiter, the limiter tends to produce and supply through capacitor 162 a square wave voltage. Amplifier unit 146 and its immediately associated circuit components perform in substantially the same manner as previously described amplifier unit 126 and its associated components. Amplifier unit 148, connected as shown in FIG. 6, functions as a trigger with respect to the voltage wave forms supplied its inverting input—thus to provide at its output a sharply defined square wave voltage having the same frequency as that of the voltage supplied such input.

Pulse counter 122, which has been shown herein only in block form, is entirely conventional in construction. The input of this counter is connected through a conductor 186 to the output of unit 148, and the output of the counter is connected to previously mentioned conductor 40 (see FIG. 1). Counter 122 counts on the leading or positive-going edge of a pulse.

With counter 122 preset to "respond" on having counted a predetermined number of pulses supplied its input, up to the time that it has counted this number of pulses it maintains its output, and hence conductor 40, at ground potential. On reaching such a count, it immediately applies a suitable positive voltage to its output—such a switching voltage conditions being effective herein to trigger clipper 22. The specific count at which this action takes place is completely a matter of choice, and, of course, may be changed to suit different desired operating conditions. On reaching the preset count, the counter is automatically reset to a zero-count condition.

Figure 7:
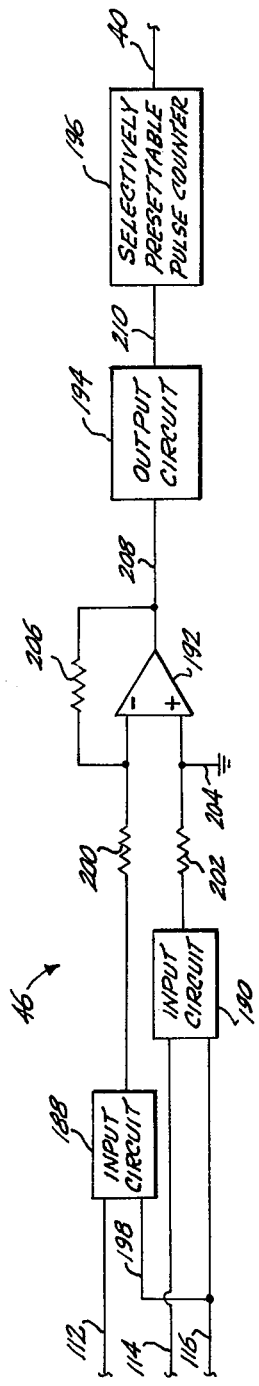
FIG. 7 is a circuit diagram, also partly in block form, showing a circuit which is used in conjunction with a photodetector like that shown in FIG. 4(b).

FIG. 7 illustrates a circuit 46 which is used in conjunction with the photodetector of FIG. 4(b). Included in this circuit are a pair of input circuits 188, 190 which are substantially identical to previously described input circuit 118, an operational amplifier unit 192 which is like the operational amplifier units above, an output circuit 194 which is identical to output circuit 120, and a counter 196 which is identical to counter 122.

Conductors 112, 114 are connected to the inverting inputs of the operational amplifier units in circuits 188, 190, respectively, which correspond to unit 124 in previously described input circuit 118. Conductor 116 is connected directly to the noninverting input of such unit in amplifier 190, and is connected through a conductor 198 to the noninverting input of the corresponding unit in circuit 188. The outputs of circuits 188, 190 are coupled through resistors 200, 202, respectively, to the inverting and noninverting inputs, respectively, of amplifier unit 192. The noninverting input of this unit is grounded through a resistor 204, and the inverting input is connected through a resistor 206 to the output of the unit. A conductor 208 connects the output of unit 192 and the input of output circuit 194. A conductor 210, corresponding to previously described conductor 186, connects the output of circuit 194 and the input of counter 196. The output of counter 196 is connected to previously mentioned conductor 40.

Amplifier unit 192 in the circuit of FIG. 7 functions as a differential amplifier with respect to signals supplied its inputs through circuits 188, 190.

3. Operational Descriptions Respecting Constructions Shown in FIGS. 4(a), 4(b), 6 and 7

Considering how the photodetector of FIG. 4(a) and the circuitry of FIG. 6 work together according to the invention, with veneer traveling on the conveyor beneath imaging system 42, the latter produces, and projects onto the photodetector, an image like that depicted in FIG. 5. As has been pointed out above, this image takes the form of elongated moving bands of light which substantially parallel the longitudinal axes of the light-sensitive surfaces in the photodetector, and move in the image along the face of the photodetector at a speed which is one half that of the travel speed of the veneer. As has also been mentioned earlier, each band in an image has a substantially uniform intensity along its length, with different bands differing in intensity in accordance with the highlight and shadow characteristics of the surface region of veneer then being viewed by the imaging system.

A number of important advantages are attained as the result of unidirectional defocusing which produces a projected image consisting of such bands. To begin with, such defocusing maximizes the effect which each local surface irregularity in veneer has when projected onto the light-sensitive surfaces in the photodetector. In other words, each localized surface condition in the viewed veneer is spread into an integrated band whereby it impinges completely across the widths of the light-sensitive surfaces in the photodetector. Further, with the bands extending completely across the photodetector, the likelihood that a localized defect inn a light-sensitive surface in the photodetector will produce an inaccuracy in the output voltage produced by the photodetector is significantly minimized. Still another important advantage is that the spreading of an image into defocused bands enables the use in the apparatus of a relatively narrow, simply constructed photodetector. To attain the same accuracy offered by the proposed construction in an arrangement wherein defocusing of the type used herein is not employed, would require the use of a relatively wide and more complicated photodetector in order for it to be able to view a sufficiently wide expanse of a traveling veneer sheet.

Preferably, and as is the case in the constructions described herein, the imaging system and the photodetector in the apparatus are so oriented relative to one another that the longitudinal axes of the bands in an image substantially parallel the longitudinal axes of the elongated light-sensitive surfaces in the photodetector. Such orientation minimizes the likelihood of a given band in an image producing simultaneous multiple voltage pulses which culd reduce the accuracy of the apparatus.

With veneer on the conveyor moving at the speed mentioned earlier—500 feet per minute, or 100 inches per second—the bands in the image thereof projected onto the photodetector move therealong at the speed of 50 inches per second. This speed of band movement, with surfaces 94, 98 distributed as described earlier, results in the production between conductors 90, 92 of an AC voltage having a frequency of 5000 Hertz.

This AC voltage is amplified to a suitable level (which is a matter of choice) in input circuit 118, and is then supplied through limiter 144 to the amplifier including operational amplifier unit 146. Limiter 144 acts on both the positive and negatives peaks of such voltage to "square" the voltage before it is applied to the noninverting input of unit 146. An amplification of such squared voltage is then supplied to the trigger including amplifier unit 148, which then supplies a quite precisely squared AC voltage (with the same frequency as that supplied it) via conductor 186 to counter 122.

Should the speed of veneer on the conveyor increase or decrease, it will now be apparent that the frequency of the AC voltage developed by the photodetector will follow in direct proportion. In other words, should the speed of the veneer increase 10% to 550 feet per minute, the frequency of the voltage generated will increase 10% to 5500 Hertz. A like situation, of course, occurs with a decrease in veneer speed. It is thus apparent that for a given geometry of an imaging system 42 and of a photodetector 44, there is a fixed known relationship which exists between the travel speed of veneer and the frequency of the electrical signals generated in the apparatus. With this fixed relationship known, a determination of the frequency of the electrical signal at any given point in time provides a direct indication of the then speed of veneer.

Also with a given geometry in an imaging system and in a photodetector, there is a fixed and known relationship between each cycle of the AC electrical signal produced and the distance traveled by veneer during such cycle. More specifically, and with reference to the construction whose operation is now being considered, it will be apparent that for each cycle in the AC voltage produced by the photodetector, a band in the image projected onto the photodetector moves from a position impinging one light-sensitive surface in the photodetector to a corresponding position impinging the next adjacent light-sensitive surface in the same array in the photodetector. This distance, in the photodetector of FIG. 4(a), is 0.01-inch. Movement of a band, of course, through this distance results from movement in the veneer in the opposite direction twice this distance—namely, 0.02-inch. Hence, 50 cycles in the output voltage produced by the photodetector result from every inch of veneer travel. Thus, simply by counting the number of cycles occurring in this voltage throughout an interval (for example, by counting the number of positive voltage pulses occurring in the voltage during the interval), one can determine immediately the precise distance which the veneer has traveled during such interval.

With the specific relationship just described, 4800 cycles or pulses in the voltage produced by the photodetector indicate the passage under the apparatus of exactly 8 feet of veneer. Accordingly, and in the circuit of FIG. 6, counter 122 is present to respond to a pulse count of 4800 pulses.

Thus, and assuming that clipper 22 has just operated, and that counter 122 is in a zero-count condition, as veneer travels on the conveyor, apparatus 24 produces an AC voltage in the manner described, and counter 122 begins counting pulses or cycles of this voltage. Regardless of how fast or slow the veneer travels, or whether its speed changes as it moves, on counter 122 registering a count of 4800, exactly 8 feet of veneer will have passed both beneath apparatus 24 and beneath the knife and anvil in the clipper. And, on this count being reached, counter 122 supplies a triggering pulse which actuates the clipper to clip an 8-foot length of veneer. Counter 122 immediately resets to a zero-count condition as was described earlier, and the operation just described begins again.

The operation of apparatus employing a photodetector like that shown in FIG. 4(b) along with circuitry such as that shown in FIG. 7 is very similar to the operation just explained. The differential amplifier formed by amplifier unit 192 combines amplifications of the signals (described earlier) generated between pairs of conductors 112, 116 and 114, 116 to supply output circuit 194 with essentially the same sort of AC voltage that is supplied output circuit 120. Output circuit 194 performs in the same manner as circuit 120 and supplies to the input of counter 196 essentially the same information supplied counter 122 by circuit 120.

As was true in the case of the photodetector of FIG. 4(a), that of FIG. 4(b) produces 50 voltage cycles or pulses for every inch of veneer travel. Hence, with counter 196 preset to respond to the count of 4800, it will supply successive triggering pulses to the clipper effective to clip the veneer into successive precise 8-foot lengths.

4. The Modification of FIG. 8

Photodetector 44 shown in FIG. 8 is similar in many respects to the photodetectors previously described, except that this photodetector employs elongated strands of fiberoptic material, ends of which are indicated generally at 212 in FIG. 8. Such material is commercially available, and its specific configuration forms no part of the present invention. The ends of these strands shown in FIG. 8 are suitably anchored within a plurality of elongated, side-by-side adjacent, substantially parallel slots, such as slots 214, 216 that are formed in a suitable rectangular support plate 218. For the purpose of obtaining clarity in FIG. 8, the proportions of the slots and the ends of the fiberoptic strands have been greatly distorted. Further, the strands' ends are shown relatively widely spaced in the slots in order that they may be distinguished in the figure. Actually, the cross sections of the strands would typically be extremely small with respect to the sizes of the slots, and the strands would be tightly packed in the slots whereby individual strands would not, except under close examination, be readily discernible. The fiberoptic strands herein are referred to as light collectors, and their ends which extend in the slots and which confront the viewer in FIG. 8 are referred to as light-collecting portions. Further, each set of ends of strands in a slot is referred to herein as being distributed in a row.

The strands in each of the slots extend from the far side of plate 218 in FIG. 8, and are grouped in bundles, such as the bundles represented by dash-dot lines 220. Further, the bundles extending from alternate slots are merged to form a single cable, such as the two cables shown in heavy dark lines at 222. With such bundling, and assembling of the bundles, the rows of fiberoptic strand ends may be thought of as being arranged in two banks, with the rows in a bank alternating (along the length of plate 218) with the rows in the other bank.

The opposite sets of ends of the fiberoptic strands in cables 222 are coupled through suitable conventional optical coupling devices, or means, such as those shown in block form at 224, 226, with a pair of conventional photodiodes, or light-sensitive electrical devices, 228, 230, respectively. These two photodiodes are connected essentially in parallel—poled in reverse directions—with the anode of diode 228 and the cathode of diode 230 connected to the opposite ends of the winding in an adjustable resistor 234. The wiper of this resistor is connected to a conductor 232. The cathode of diode 228 and the anode of diode 230 are connected to a conductor 236.

Conductors 232, 236 correspond to previously described conductors 90, 92, and may be connected to circuitry identical to that shown in FIG. 6.

From the descriptions of the other modifications which have been given heretofore, it is believed obvious how the modification of FIG. 8 will operate. The specific frequency of the voltage which photodiodes 228, 230 will generate will depend both upon the geometry of the imaging system used in conjunction with the photodetector, as well as the geometry and distribution of the slots along plate 218. The number of cycles or pulses in such voltage which are produced for each inch of travel of veneer will also depend upon the same considerations.

5. Conclusion

The present invention thus proposes a method and apparatus which are capable of producing a signal having characteristics directly accurately indicative of both the speed and travel distance of a viewed article, such as a traveling sheet of veneer. As has been indicated earlier, the apparatus is not limited to use with veneer.

The specific fixed relationship which will exist in a given installation between article speed and travel and the voltage produced in the apparatus is completely a matter of choice, and depends, as has been indicated, on the geometries of both the imaging system and the photodetector in the apparatus.

Through the use of a defocusing lens in an imaging system, which lens produces unidirectional defocusing in an image for projection onto a photodetector, a high degree of reliability is attained by the apparatus. By projecting such an image, with the elongated bands therein substantially parallel to the elongated light-sensitive surfaces in a photodetector, accuracy in the information reported by the apparatus is enhanced.

By incorporating a pair of positive lenses arranged with respect to one another as described, the imaging system of the invention conveniently and importantly ignores changes in the distance, within a predetermined range of distances, between the apparatus and the article viewed.

With the various photodetectors described and shown herein, and the circuits used in conjunction therewith, a change in overall light intensity on the viewed surface of a traveling article, and hence on the surface of a photodetector, will not affect the accuracy of information derived, so long, of course, as there is sufficient reflected light from the article surface to assure an adequate level in the voltage generated by a photodetector. More specifically, with the photodetectors including two arrays or banks of light-sensitive surfaces as described, common-mode changes in overall illumination on a photodetector produce no net change in an output signal.

While certain specific forms of apparatus have been disclosed herein for accomplishing the objectives of the invention, it is appreciated that further modifications are possible which will attain the same objectives without departing from the spirit of the invention.

It is claimed and desired to secure by Letters Patent:

1. Apparatus for monitoring the speed and travel of an article along a path, said apparatus in operative condition comprising imaging means disposed adjacent said path for producing a unidirectionally defocused image derived from an article's movement along the path, with such an image comprising elongated bands of light which move in the image at a common speed and through a common travel distance at all times proportional to those of the article, said imaging means including a lens portion having a cylindrical lens surface whose axis of revolution is normal to the direction of defocusing produced by the lens portion, and image-receiving means comprising plural spaced light receptors positioned adjacent said imaging means and arranged to be impinged in predetermined succession by such bands for effecting an electrical signal having characteristics which are directly indicative of the speed and travel of the bands.

2. The apparatus of claim 1, wherein said plural light receptors comprise means defining elongated light-sensitive surfaces arranged with their longitudinal axes substantially parallel to one another, and distributed in a pair of side-by-side adjacent arrays, with each surface in each array offset from each adjacent surface in the other array progressing along the arrays in a direction normal to said axes.

3. The apparatus of claim 2, wherein said surfaces are oriented whereby the longitudinal axes of bands of light in an image substantially parallel the longitudinal axes of the surfaces.

4. The apparatus of claim 1, wherein said plural light receptors comprise means defining elongated interdigitated light-sensitive surfaces formed in two banks and arranged in a single array, with each surface in a bank spaced from each adjacent surface therein by a surface in the other bank, and with the surfaces in the two banks disposed with their longitudinal axes substantially parallel to one another.

5. The apparatus of claim 4, wherein said surfaces are oriented whereby the longitudinal axes of bands of light in an image substantially parallel the longitudinal axes of the surfaces.

6. The apparatus of claim 1, wherein said plural light receptors comprise elongated fiberoptic light collectors including light-collecting portions arranged in side-by-side substantially parallel rows.

7. The apparatus of claim 6, wherein said rows are arranged in two banks, with alternate rows forming a bank, and which further includes a pair of light-sensitive electrical devices, and a pair of optical coupling means each optically coupling a different bank with a different device.

8. The apparatus of claim 1, wherein said imaging means is constructed to ignore changes in distance, within a predetermined range of distances, between it and an article traveling along said path, and to this end includes a pair of spaced, coaxial, positive lens portions positioned with the focal point of one lens portion coincident with the nodal point of the other lens portion, said one lens portion being disposed in the apparatus toward said path from said other lens portion.

9. Apparatus for following the speed and travel of an article along a path comprising imaging means adapted to be positioned adjacent said path for viewing such an article, and for producing from such viewing, at a receiving station adjacent the imaging means, a projected, distorted, unidirectionally defocused image of the article viewed, with such image comprising elongated parallel bands of light which move in the image at a common speed and through a common travel distance proportional to those of the article, and in a common direction which is at an angle to the bands' longitudinal axes, said imaging means including a lens portion having a cylindrical lens surface whose axis of revolution is normal to the direction of defocusing produced by the lens portion, each band in the receiving station, along the length of the band, being characterized by substantially uniform intensity, and different bands in the station having different intensities, and image-receiving means positioned in said receiving station to be impinged by the gands in such an image, and constructed to produce during such impingement an electrical signal which is directly indicative of the speed and travel of the bands, said image-receiving means comprising plural, elongated, laterally spaced light receptors oriented so as to be impinged, but one at a time, by the different moving bands.

10. The apparatus of claim 9, wherein said plural light receptors comprise means defining elongated, light-sensitive surfaces arranged with their longitudinal axes substantially parallel to one another, and distributed in a pair of side-by-side adjacent arrays, with each surface in each array laterally offset from each adjacent surface in the other array progressing along the arrays in a direction normal to said axes.

11. The apparatus of claim 10, wherein said surfaces are oriented whereby the longitudinal axes of bands of light in an image substantially parallel the longitudinal axes of the surfaces.

12. The apparatus of claim 9, wherein said plural light receptors comprise means defining elongated interdigitated light-sensitive surfaces formed in two banks and arranged in a single array, with each surface in a bank spaced from each adjacent surface therein by a surface in the other bank, and with the surfaces in the two banks disposed with their longitudinal axes substantially parallel to one another.

13. The apparatus of claim 12, wherein said surfaces are oriented whereby the longitudinal axes of bands of light in an image substantially parallel the longitudinal axes of the surfaces.

14. The apparatus of claim 9, wherein said imaging means is constructed to ignore changes in distance, within a predetermined range of distances, between it and an article traveling along said path, and to this end includes a pair of spaced, coaxial, positive lens portions positioned with the focal point of one lens portion coincident with the nodal point of the other lens portion, said one lens portion being disposed in the apparatus toward said path from said other lens portion.

15. In apparatus for monitoring the speed and travel of an article along a path through viewing such an article and generating from such viewing an electrical signal which is directly indicative of the article's speed and travel, imaging means comprising a first positive lens portion positioned for directly viewing such an article, a second positive lens portion spaced from and coaxial with said first lens portion, and located on the far side of the latter from said path, said first and second positive lens portions being disposed with the focal point of said first lens portion coincident with the nodal point of said second lens portion, and a defocusing lens portion coaxial with said first and second lens portions, and constructed to produce at one side thereof a unidirectionally defocused image of what is presented it on its side opposite said one side.

16. The apparatus of claim 15, wherein said imaging means, on viewing an article on said path, produces a image comprising elongated bands of light which move in the image at a speed and through a travel distance which are proportional to those of the article on the path, and which further includes image-receiving means positioned to be impinged by such bands for producing said electrical signal, said image-receiving means comprising plural elongated spaced light receptors arranged to be impinged by the moving bands in an image, with the longitudinal axes of the bands substantially paralleling the longitudinal axes of the receptors.

* * * * *

UNITED STATES PATENT AND TRADEMARK OFFICE
CERTIFICATE OF CORRECTION

PATENT NO. : 3,994,583
DATED : November 30, 1976
INVENTOR(S) : Thomas B. Hutchins, IV It is certified that error appears in the above-identified patent and that said Letters Patent are hereby corrected as shown below:

In the claims:

Column 16, claim 9, line 58, "gands" should be --bands--.

Column 18, claim 16, line 21 "a" should be --an--.

Signed and Sealed this

Eighth Day of March 1977

[SEAL]

Attest:

RUTH C. MASON
Attesting Officer

C. MARSHALL DANN
Commissioner of Patents and Trademarks